United States Patent
Flöck et al.

(10) Patent No.: US 7,032,453 B2
(45) Date of Patent: Apr. 25, 2006

(54) METHOD AND APPARATUS FOR THE DIAGNOSIS OF NATURAL VIBRATIONS IN A MECHATRONIC SYSTEM

(75) Inventors: Thomas Flöck, Falkendorf (DE); Jens Hamann, Fürth (DE)

(73) Assignee: Siemens Aktiengesellschaft, München (DE)

( * ) Notice: Subject to any disclaimer, the term of this patent is extended or adjusted under 35 U.S.C. 154(b) by 77 days.

(21) Appl. No.: 10/478,898

(22) PCT Filed: Sep. 12, 2001

(86) PCT No.: PCT/DE01/03503

§ 371 (c)(1),
(2), (4) Date: Nov. 24, 2003

(87) PCT Pub. No.: WO03/027627

PCT Pub. Date: Apr. 3, 2003

(65) Prior Publication Data

US 2004/0144177 A1   Jul. 29, 2004

(51) Int. Cl.
*G01M 7/02* (2006.01)

(52) U.S. Cl. .......................... 73/664; 248/550
(58) Field of Classification Search .......... 73/662–665; 240/550; 248/550
See application file for complete search history.

(56) References Cited

U.S. PATENT DOCUMENTS

| | | | |
|---|---|---|---|
| 5,602,759 A | 2/1997 | Harashima et al. | 108/20 |
| 5,724,893 A | 3/1998 | Lee et al. | 73/11.04 |
| 5,812,420 A * | 9/1998 | Takahashi | 700/280 |
| 6,036,162 A * | 3/2000 | Hayashi | 248/550 |
| 6,202,492 B1 * | 3/2001 | Ohsaki | 73/662 |
| 6,213,443 B1 * | 4/2001 | Wakui | 248/550 |
| 6,286,644 B1 * | 9/2001 | Wakui | 188/378 |
| 6,721,668 B1 | 4/2004 | Momoi et al. | 702/54 |
| 2003/0057346 A1 * | 3/2003 | Wakui | 248/550 |

FOREIGN PATENT DOCUMENTS

| | | |
|---|---|---|
| CN | 1253623 A | 5/2000 |
| JP | 61 105438 A | 5/1986 |

* cited by examiner

*Primary Examiner*—Hezron Williams
*Assistant Examiner*—Rose M. Miller
(74) *Attorney, Agent, or Firm*—Henry M. Feiereisen

(57) ABSTRACT

A method for the diagnosis of natural vibrations in a mechatronic system, includes at least one rigid body (WT1, WT2), which is moved relative to another rigid body (S) by means of at least one numerically-controlled drive, whereby the natural vibrations are caused by the drive (A1, A2) and are detected by sensors (WM1, WM2, N1, N2, BA1, BA2,) internal or external to the system. The drives (A1, A2) can be used as a system-internal, vibration-generator, so-called rotatory shakers, by superimposing white noise on a constant speed for the drive, or by wobbling the frequencies.

14 Claims, 4 Drawing Sheets

METHOD AND APPARATUS FOR THE DIAGNOSIS OF NATURAL VIBRATIONS IN A MECHATRONIC SYSTEM

BACKGROUND OF THE INVENTION

The invention relates to a method for the diagnosis of natural vibrations in a mechatronic system, for example a machine tool, packaging machine and other manufacturing machines, e.g. in the form of a robot. These mechatronic systems normally include a plaurality of machine elements, including drives, which cause unwanted vibrations during operation of the system. Each one of these vibrations results from a combination of forced vibrations, caused by external forces or unbalances for example, as well as from natural vibrations which are encountered when one or more of the resonances of the machine are excited. These vibrations adversely affect the quality of products produced by the mechatronic system, so that ways to substantially reduce these vibrations are searched for.

Computation and visualization of these vibrations therefore gain increasingly importance. This is true in particular for the area of vibration diagnosis. This refers hereby essentially to the effect which the machine elements of the mentioned complex mechatronic systems have on the dynamic behavior of the overall system.

The purpose of vibration diagnosis is to make the technical designer of a mechatronic system understand as clearly as possible the vibration behavior of the system in order to give him a tool to use constructive measures and/or select materials for inhibiting vibration.

For diagnosis of natural vibrations of a mechatronic system, it is necessary to excite it. Conventional methods use external vibration exciters, so-called translatory shakers, which are attached at different points of a rigid body of a mechatronic system. Vibrations of different frequencies are impressed upon the rigid body via these shakers. At different areas of the rigid body, especially at its corner points, sensors, for example by means of displacement measuring systems, accelerometers, pressure gauges, etc., are used to detect the natural vibrations.

A mathematical model of the vibration behavior of the overall system can be formed on the basis of the measured values. As all system components are, however, interconnected, a system of coupled differential equations is obtained which are converted by means of model analysis, i.e. by means of an algorithmic mathematical uncoupling, into different scalar equations, so that information can be provided about the natural frequency, the attenuation, and form of the vibration for each mode of a natural vibration.

On the basis of these equations, a model of the mechatronic system can be simulated and visualized by means of a simple wire-frame model for example. Such wire-frame models are conventional and are constituted by corner points where sensors are typically attached in such a manner that a maximum yield of information is obtainer. The design engineer thus is given insight into the system dynamics and can take vibration-absorbing constructive measures through modification of the oscillation parameters that are now known.

The process set forth above for generating natural vibrations using shakers external to the system has the drawback that the drives and their part components are not included in the vibration diagnosis and the simulation.

Conventional software packets for model analysis identify and represent vibration modes in such a manner that either translatory or rotatory degrees of freedom are related to. A simultaneous visualization of both types of degrees of freedom is achieved in practice by so including the rotatory degrees of freedom into the holistic visualization that rotatory vibration modes are stimulated using movements of a rigid body in relation to a fixed point. However, this approach does naturally not take into account the compliance that continuously exists between mechanical structure and drives.

SUMMARY OF THE INVENTION

It is therefore an object of the invention to provide a method for the diagnosis of natural vibrations which allows inclusion of the entirerty of the system components, including the drives.

This object is attained by a method for the diagnosis of natural vibrations of a mechatronic system, wherein the system includes at least one rigid body which is movable relative to another rigid body by at least one numerically-controlled drive, wherein the natural vibrations are excited by the drive and detected by sensors. Thus, the need for a system-external shaker is eliminated which is no longer required because the drives assume their task. Through use of the drives as additional rotatory shakers, the eleectromechanic properties of the drives can enter into the integrated mechatronic modelling so that the afore-stated compliances between mechanical structure and drives can be better ascertained.

According to an advantageous configuration of the method, the drive, which runs, for example, at a constant speed, is superimposed by white noise. White noise is used to excite the natural vibrations of the system.

According to a further advantageous configuration of the method, the natural vibrations of the system can also be excited by superimposing the speed at which the drive runs with sinusoidal vibrations of varying frequency. This method of known conventionally as "wobbling".

It is especially advantageous that the described method allows a determination of the natural vibrations by means of system-internal sensors, such as, for example, displacement measuring systems, acceleration sensors, speed sensors, pressure measuring systems, etc. As a consequence, the vibration diagnosis can be carried out completely autarchic, i.e. with system-internal means, so long as the numerical control of the mechatronic system includes a respective hardware module and/or software module.

According to a further advantageous configuration of the invention, the method can be enhanced by attaching to the mechatronic system additional sensors, like, for example, acceleration pick-ups These additional sensors may be attached, when needed, or remain permanently on the system. When provisions are made, for example, to carry out repeated vibration diagnosis during the service life of the mechatronic system, because of the assumption, for example, that the natural vibrations change as a result of material fatigue and/or other reasons, the additional sensors may remain also on the system for simplification of these further diagnoses.

The method can be carried out advantageously with an apparatus for the diagnosis of natural vibrations of a numerically-controlled mechatronic system, wherein the apparatus includes at least one rigid body which is moved relative to another rigid body by at least one numerically-controlled drive, wherein the numeric control of the system includes a hardware module and/or software module, wherein the hardware module and/or software module includes means for excitation of natural vibrations of the system by the numerically-controlled drives as well as means for processing the natural vibrations detected by the sensors.

According to an advantageous configuration of the apparatus, the module can be connected as external module to the numeric control. The numeric control would hereby only include the terminals for the module so that the module can be connected to the numeric control, when needed, i.e. for execution of the vibration diagnosis. As a result, compexity and costs of the numeric control can be kept low. The vibration diagnosis could then be carried out "on order" by a service expert, for example, by the service department of the supplier of the numeric control. In this case, there would even be no need for the customer to pay for the expenses for the module. The separate module may, however, also be designed in such a universal manner, as to be suitable for a wide variety of machines and numeric controls so that a single module can be used for the diagnosis of various mechatronic systems.

The module may, however, also form an integral part of the numeric controls. This would simplify the repeated diagnosis of vibration of a mechatronic system.

BRIEF DESCRIPTION OF THE DRAWING

An exemplary embodiment of the invention will now be described in more detail with reference to the drawing, in which.

DETAILED DESCRIPTION OF PREFERRED EMBODIMENTS

Figure 1:
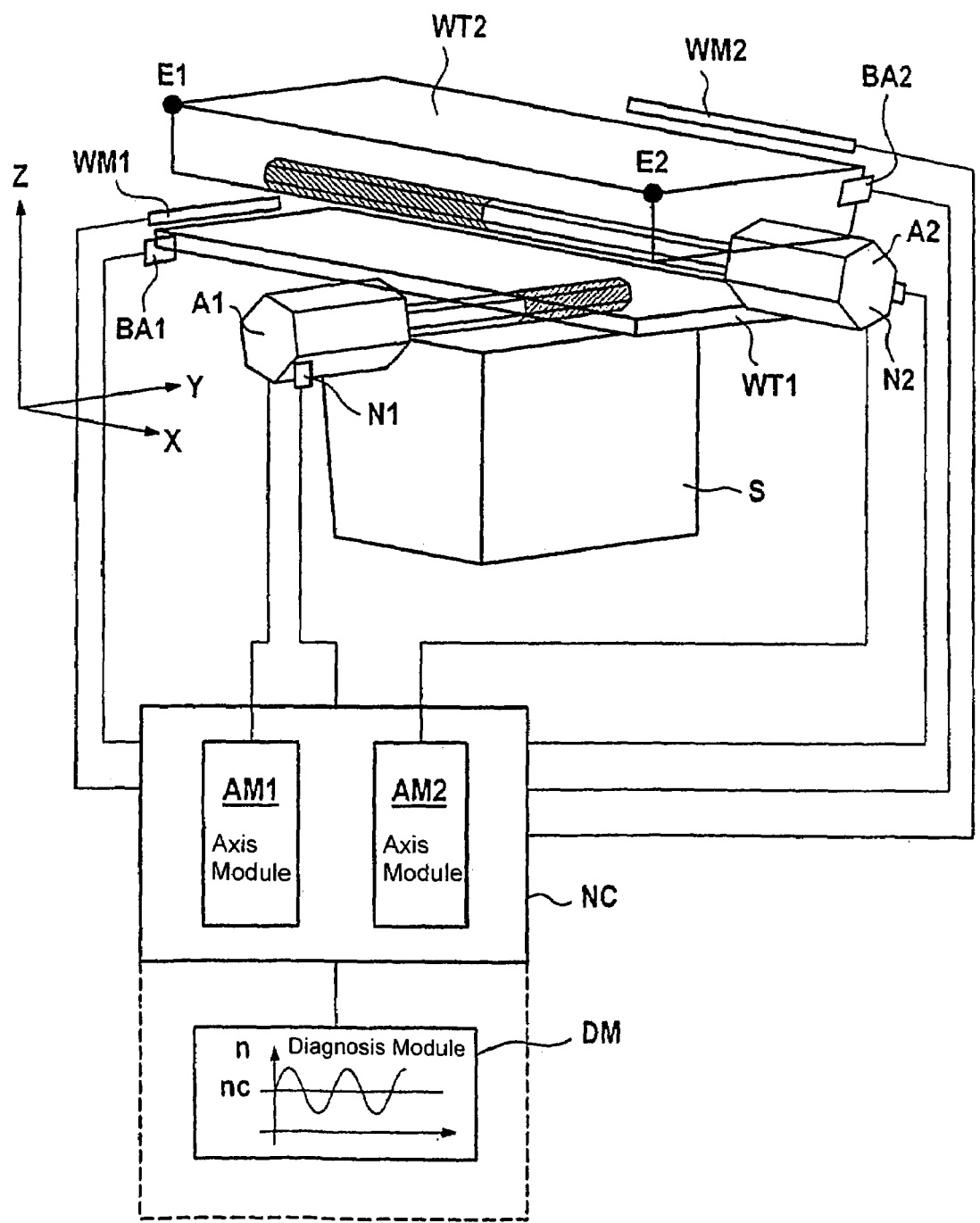
FIG. 1: shows the wire-frame model or a machine tool.

FIG. 1 shows the wire-frame model of a machine tool with a pedestal S, a tool table arranged on the pedestal and including a table element WT1, movable in Y-direction, and a table element movable in X-direction. The table elements WT1 and WT2 are operated by the drives A1 and A2 and the pertaining spindles. The color boundary of the colors black and grey of the spindles designate the connection areas between the respective table element WT1, WT2 and the spindles.

The asymmetric illustration is caused by the generation of the wire-frame model which is defined by the corner points of the structural parts or components being viewed. In the present example, these corner points are so disposed as to be asymmetric. The shape of the wire-frame model should reflect the present geometry in a best possible manner through simplest basic elements. Moreover, the areas are selected as corner points, such as, e.g., E1 and E2, that also yield meaningful measuring information.

Attached to the components of the machine tool represented by the wire-frame model are displacement measuring systems WM1 and WM2 as sensors. These displacement measuring systems normally belong to the system-internal components of the actual machine tool. These additional displacement measuring systems may, of course, be provided, if required for the diagnosis of the natural vibrations. The Figure depicts symbolically acceleration pick-ups BA1 and BA2 as further sensors for the diagnosis of the natural vibrations. Of course, further additional sensors may be used, such as, for example, pressure gauges, etc. The speed sensors N1, N2 of the drives A1, A2, which are also present in the system, are also used as further sensors for the diagnosis of the natural vibrations.

The machine tool is controlled by a numeric control NC which inlcudes for each drive an axis module AM1, AM2. In concert with the axis modules AM1, AM2, the numeric control regulates the drives A1, A2 in a conventional manner.

The numeric control NC is connected with a diagnosis module DM for vibration diagnosis. The diagnosis module DM may be a separate module which is implemented on a data processing machine, for example a laptop. It may, however, also form an integral part of the numeric control NC—as indicated also by the broken line.

Diagnosis of the natural vibrations is realized by operating the drives A1, A2 at constant speed nc, as illustrated in the graphical representation of the block diagram of the diagnistic module DM. This constant speed nc is superimposed with white noise—symbolized in the Figure by the sine curve. White noise contains all frequency portions and thus also those that excite the system to produce natural vibrations. The constant speed nc could also be superimposed with varying frequencies, whereby these varying frequencies are applied successively (wobbled).

The natural vibrations of the mechatronic system are thereby reliably excited and can be detected by the displacement measuring systems WM1, WM2, the acceleration pick-ups BA1, BA2, and the speed sensors N1, N2.

As the natural vibrations are excited by the drives A1, A2, also the components of these drives, which also contributre to the vibration behavior of the overall system, are considered. As a consequence, the vibration diagnosis determines also the continuously present compliances between the machine structure and the drives.

Relaxation oscillations can be detected by suitably placing the sensors as far as possible also at the corner points of the rigid body. Sensors at the corner points E1 and E2 allow detection of, for example relaxation oscillations of the tool table WT2 about the y-axis. The same is true for the sensors (not shown here) at further corner points, e.g. at the corner points of the tool table WT1.

The results gained from the vibrations diagnosis allow a visualization of the vibration behavior of the mechatronic system by a wire-frame model, for example. With the assistance of the modal analysis, the animation of the rotatory vibration modes in the space is gained from the combination of a three-dimensional linearized translation with a one-dimension rotation about a single axis. The vibration diagnosis is significantly simplfied by examining the effect of all machine elements partaking in the respective vibration mode and demonstrating it to the customer. An advantage that cannot be underestimated is hereby afforded for the acceptance of the measured results and possibly of the simulated results that have been suited to the measurements because clearer information can be made about the influence by the machine structure and the drives upon the dynamics of the mechatronic system.

Figure 2:
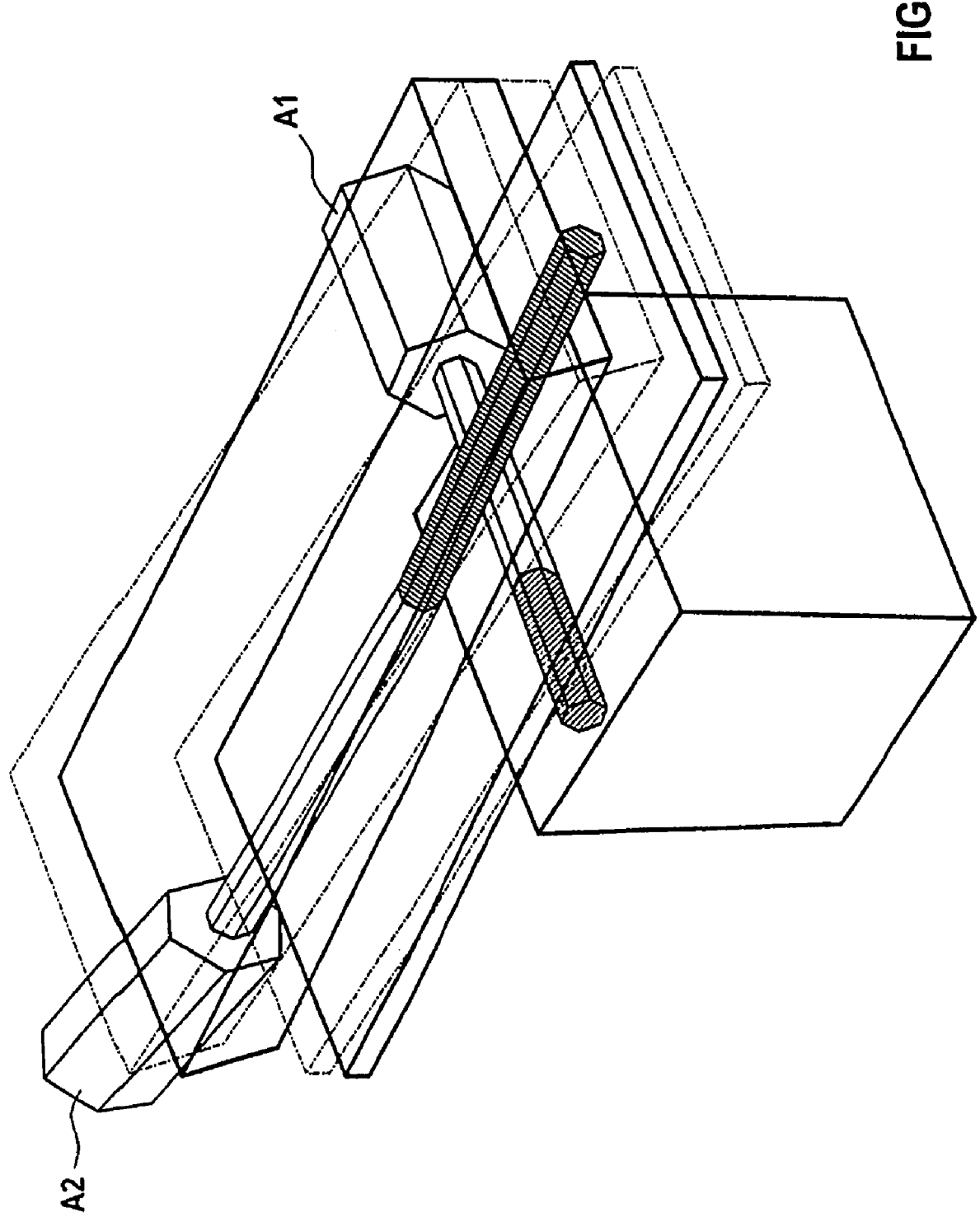
FIGS. 2, 3 and 4: show various vibrations models.
Figure 3:
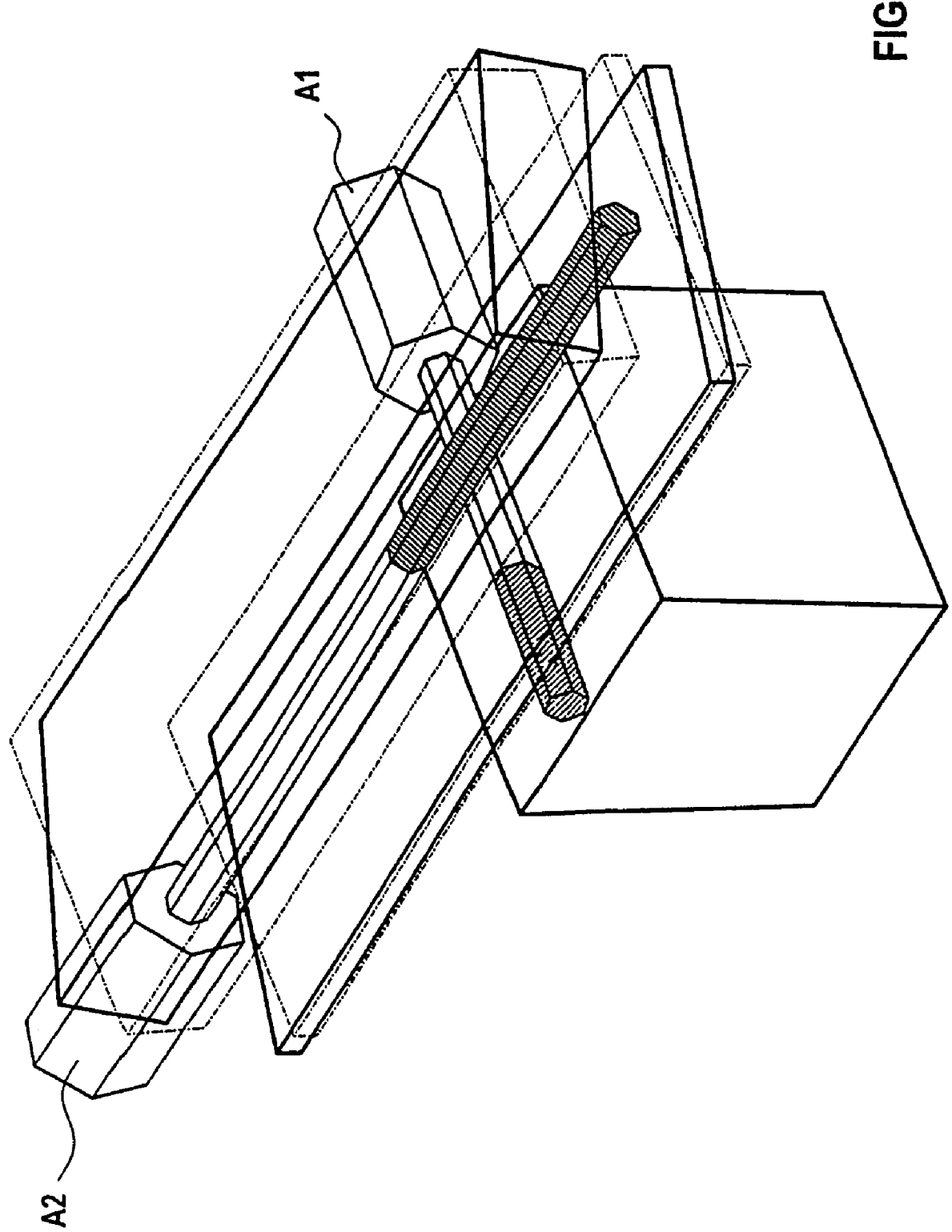
Figure 4:
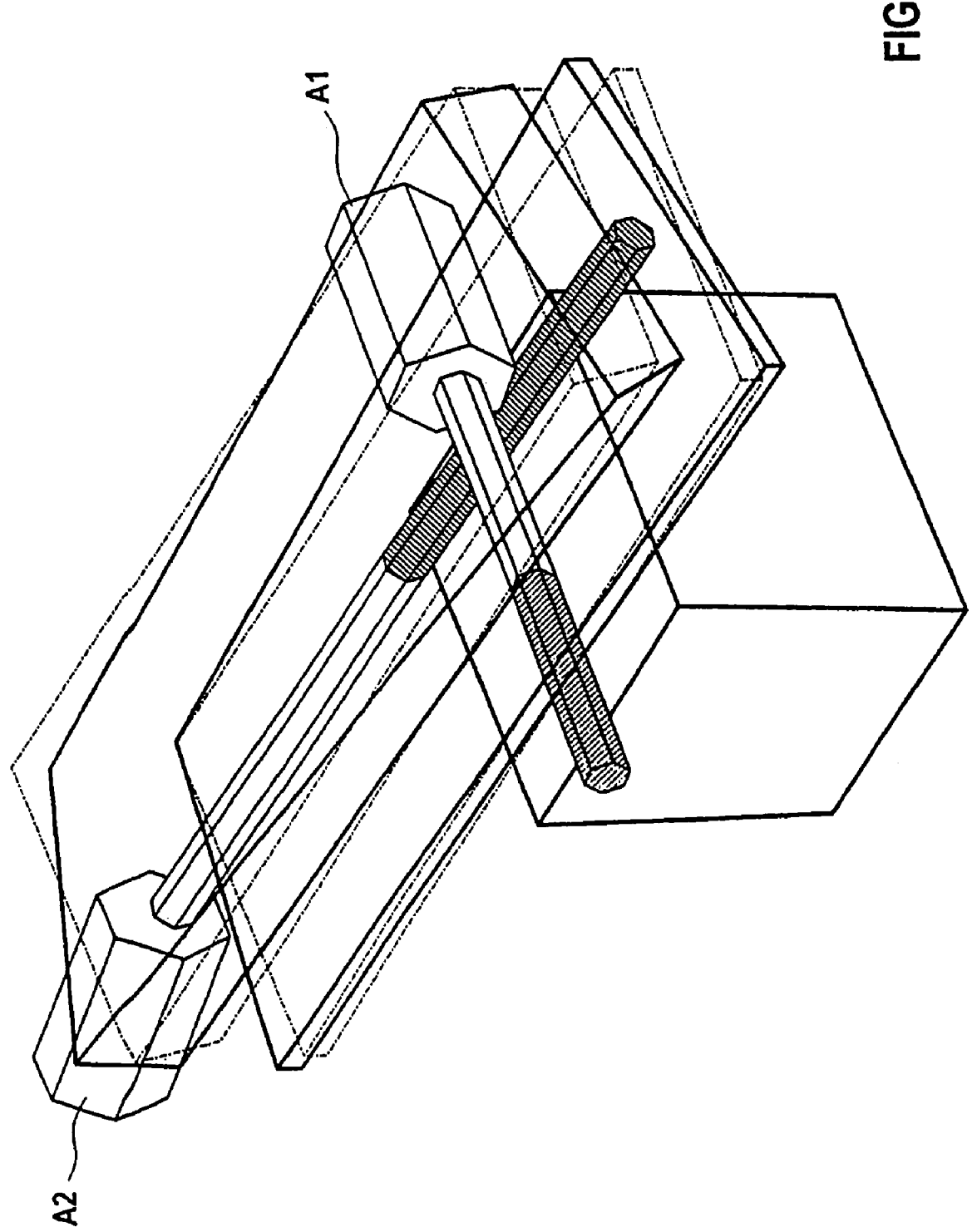

FIGS. 2, 3 and 4 show some vibration modes by way of example at varying frequencies. The deformations are depicted by broken line so that they can be better visualized, and the difference compared to the undeformed state becomes clearer. The individual elements of the respective Figure are known from FIG. 1. FIG. 2 shows a vibration mode at 56 Hertz, FIG. 3 shows a vibration mode at 81 Hertz, and FIG. 4 shows a vibration mode at 106 Hertz.

Each vibration mode on conventional mechatronic machines contains translatory as well as rotatory degrees of freedom whose separate consideration is of little value in view of a constant linkage between translatory and rotatory degrees of freedom. The procedure described herein fully considers this linkage from the mechatronic viewpoint by the simulatenous animation of all geometric basic elements, such as parallelepiped and cylinder, which represent the wire-frame model. As a result, reliable information is generated about the influence of rotatory and translatory degrees of freedom on the resultant vibration mode, when the drives are coupled in a compliant way to the mechanical structure.

Shakers, external to the system and acting translatory, can easily be integrated into the developed modal analysis tool for generating additional information.

What is claimed is:

1. A method for ascertaining natural vibrations in a mechatronic system, comprising the steps of:
    moving at least one rigid body relative to another rigid body by means of at least one numerically-controlled drive; and
    detecting natural vibrations, generated by the drive, by means of sensors,
    wherein the natural vibrations are generated by the drive by superimposing white noise upon a rotation speed of the drive.

2. The method of claim 1, wherein the sensors in the detecting step are system sensors.

3. The method of claim 1, wherein the detecting step includes additional sensors.

4. A method for ascertaining natural vibrations in a mechatronic system, comprising the steps of:
    moving at least one rigid body relative to another rigid body by means of at least one numerically-controlled drive; and
    detecting natural vibrations, generated by the drive, by means of sensors,
    wherein the natural vibrations are generated by the drive by superimposing sinusoidal oscillations upon a rotation speed of the drive.

5. The method of claim 4, wherein the sensors in the detecting step are system sensors.

6. The method of claim 4, wherein the detecting step includes additional sensors.

7. A method for ascertaining natural vibrations in a mechatronic system, comprising the steps of:
    operating a numerically-controlled drive at a constant rotation speed;
    exciting the drive to generate natural vibrations;
    moving at least one rigid body relative to another rigid body by means of the drive; and
    detecting the natural vibrations generated by the drive by means of sensors,
    wherein the exciting step includes superimposing the rotation speed of the drive with white noise.

8. A method for ascertaining natural vibrations in a mechatronic system, comprising the steps of:
    operating a numerically-controlled drive at a constant rotation speed;
    exciting the drive to generate natural vibrations;
    moving at least one rigid body relative to another rigid body by means of the drive; and
    detecting the natural vibrations generated by the drive by means of sensors,
    wherein the exciting step includes superimposing the rotation speed of the drive with sinusoidal oscillations.

9. Apparatus for the diagnosis of natural vibrations of a numerically-controlled mechatronic system, comprising:
    at least one rigid body;
    a numeric control having at least one module selected from the group consisting of hardware module and software module;
    at least one drive operated by the numeric control for moving the rigid body in relation to another rigid body, wherein the module includes means for superimposing a rotation speed of the drive with white noise to generate natural vibrations;
    a plurality of sensors for detecting the natural vibrations; and
    processing means for processing the natural vibrations detected by the sensors.

10. The apparatus of claim 9, wherein the module is connectable to the numeric control.

11. The apparatus of claim 9, wherein the module is an integral part of the numeric control.

12. Apparatus for the diagnosis of natural vibrations of a numerically-controlled mechatronic system, comprising:
    at least one rigid body;
    a numeric control having at least one module selected from the group consisting of hardware module and software module;
    at least one drive operated by the numeric control for moving the rigid body in relation to another rigid body, wherein the module includes means for superimposing a rotation speed of the drive with sinusoidal oscillations to generate natural vibrations;
    a plurality of sensors for detecting the natural vibrations; and
    processing means for processing the natural vibrations detected by the sensors.

13. The apparatus of claim 12, wherein the module is connectable to the numeric control.

14. The apparatus of claim 12, wherein the module is an integral part of the numeric control.

* * * * *